United States Patent Office 3,437,669
Patented Apr. 8, 1969

3,437,669
PROCESS FOR PRODUCING AN ODOROUS ISOMER OF DIISOPROPYL DIHYDROCOUMARIN
Jerome King, Fairlawn, N.J., assignor to Universal Oil Products Company, Des Plaines, Ill., a corporation of Delaware
No Drawing. Filed Dec. 27, 1966, Ser. No. 604,657
Int. Cl. A61k 7/00; C07d 5/36, 7/28
U.S. Cl. 260—343.2                 10 Claims This invention relates to a process for preparing an odorous isomer of diisopropyl-3,4-dihydrocoumarin and, more particularly, to a process for preparing such isomer by treating substantially odorless diisopropyl dihydrocoumarin isomers with an isomerization catalyst comprising a modified orthophosphoric acid.

Diisopropyl-3,4-dihydrocoumarin is a highly valuable perfumery material characterized by a very fine musk-like odor similar to the naturally occurring macrocyclic musks such as muskone or civitone. While this material usually exists as a mixture of isomers, actually only one of the isomers, believed to be the 5,7-isomer, possesses the desirable odor properties with the other isomers being substantially odorless. In preparing diisopropyl-3,4-dihydrocoumarin, such as by the condensation of 3,4-dihydrocoumarin with propylene in the presence of an acid catalyst, the diisopropyl dihydrocoumarin product of the reaction usually is treated, such as by distillation, to separate the valuable odor isomer from the odorless isomers. This, of course, leaves a substantial amount of diisopropyl dihydrocoumarin isomers which have little practical value. It has now been discovered, however, that these odorless and valueless diisopropyl dihydrocoumarin isomers may be readily and simply converted to the highly valuable odorous isomer by treating with a modified orthophosphoric acid isomerization catalyst.

Accordingly, an object of this invention is to provide a process for preparing an odorous isomer of diisopropyl-3,4-dihydrocoumarin from odorless isomers. Another object is to provide a process for preparing such isomer by treating odorless diisopropyl dihydrocoumarin isomers with a modified orthophosphoric acid isomerization catalyst. These and other objects of this invention will be apparent from the following further detailed description thereof.

The treatment of the odorless diisopropyl-3,4-dihydrocoumarin isomers according to this invention to produce the odorous isomer is effected by contacting the odorless isomers with a modified orthophosphoric acid catalyst. This modified orthophosphoric acid isomerization catalyst may be described quantitatively as a mixture of substantially anhydrous orthophosphoric acid and phosphorus pentoxide. As used herein, the term substantially anhydrous orthophosphoric acid means that there is a sufficient quantity of phosphorus pentoxide present in the catalyst mixture to theoretically convert any water present to orthophosphoric acid. Upon a stoichiometric basis the substantially anhydrous orthophosphoric acid portion of the catalyst mixture may also be described as 100 percent $H_3PO_4$ or, in terms of its phosphorus pentoxide equivalent content, as 72.4 weight percent phosphorus pentoxide.

The quantity of the phosphorus pentoxide, calculated as $P_2O_5$, present in the catalyst mixture with the substantially anhydrous orthophosphoric acid is extremely important to the success of the catalyst mixture in effecting the treatment. This amount of phosphorus pentoxide may range from about 2 to 12 percent based upon the total weight of the catalyst mixture with a more limited amount of from about 4 to 10 percent being preferred. While the modified orthophosphoric acid catalyst of this invention may be described quantitatively as a mixture of substantially anhydrous orthophosphoric acid and phosphorus pentoxide in the specific indicated proportions, the activity and effectiveness of the catalyst mixture in producing the desired odorous isomer is also related to its manner of preparation. Accordingly, it is important in describing the catalyst mixture to also refer to the catalyst mixture in terms of its preparation. The reason that this is necessary may be due to the fact that the chemistry of mixtures of orthophosphoric acid and phosphorus pentoxide at the levels of concentration of the catalyst mixture of this invention is quite complex. Thus the actual chemical or physical composition of the catalytic mixture, and hence its catalytic activity, is in part a function of its manner of preparation.

In order that the catalytic mixture have the desired isomerization activity, it is preferred that it be prepared by adding phosphorus pentoxide to an aqueous orthophosphoric acid having, for example, an 80 to 85 weight percent concentration of acid. The amount of the phosphorus pentoxide added is adjusted to convert stoichiometrically all of the water present in the aqueous acid to orthophosphoric acid and, in addition, to provide an excess of the phosphorus pentoxide within the range of from about 2 to 12, and preferably from about 4 to 10 percent, based upon the total weight of the ultimate mixture. The addition and mixing of the phosphorus pentoxide with the aqueous orthophosphoric acid may be effected in a variety of different ways with relatively comparable results. It is important, however, particularly to obtain a highly active catalyst mixture, to maintain the mixture, during the addition of the phosphorus pentoxide, at a temperature within the range of from 100° to about 150° C. and preferably within the range of from about 100° to about 130° C.

The odorless diisopropyl-3,4-dihydrocoumarin isomers which may be treated according to this invention by contacting with the isomerization catalyst mixture to form the highly valuable odorous isomers comprise any of the 5 possible odorless isomers. The odorous isomer is believed to be the 5,7-isomer it may also be defined as the isomer having a fine musk-like odor which boils at about 159° to 161° C. at 3 mm. Hg pressure and has a refractive index of $n_D^{20}$ of 1.5284 to 1.5287. While any of the odorless isomers such as the 6,8 or 6,7 isomers may be treated individually, it usually is more convenient to simply treat a mixture of isomers without separating any of the particular isomers. The isomer mixture subject to treatment may also contain other isopropyl substituted 3,4-dihydrocoumarins such as mono- or tri-substituted compounds inasmuch as these do not interfere with the treatment.

The treatment of the odorless isomers is effected by simply contacting the isomers either individually or in admixture with the isomerization catalyst mixture and maintaining such contact for a period of time necessary to effect the desired conversion. The conditions used in effecting the treatment may be widely varied with relatively comparable results. Generally, the temperature may range from about 110° to 180° C. with a more limited range of from about 140° to 170° C. being preferred. The quantity of the catalyst mixture present may be varied and is dependent upon such factors as the quantity of phosphorus pentoxide present in the mixture, the treating temperature and the conversion rate desired. Generally, a quality of the catalyst mixture ranging from about 25 to 300 percent based upon the weight of the diisopropyl dihydrocoumarin charge is sufficient, with a more limited range of from about 50 to 200 percent being conveniently utilized. The pressure at which the treatment is effected is usually not an important factor and atmospheric pressure is suitably used. The time required to effect the treatment will vary depending upon the reaction temperature, the particular diisopropyl dihydrocoumarin isomer or isomers being treated and the quantity and type of the catalyst mixture used. Usually, however, in a batch-type operation, the time required to achieve a substantial formation of the odorous isomer, which may be less than an equilibrium proportion, ranges from about ½ hour to 20 hours or more.

The treatment of this invention may be conducted in a batch- or a continuous-type manner. A batch-type operation is preferred, however, and an illustrative procedure comprises first preparing the catalyst mixture by charging the desired quantity of aqueous orthophosphoric acid, for example, 85 weight percent acid, to a suitable stirred reaction vessel. While maintaining the temperature within the desired limits, a measured quantity of phosphorus pentoxide is added to form the catalyst mixture. The odorless diisopropyl-3,4-dihydrocoumarin charge, preferably an isomeric mixture, is then charged to the vessel and the temperature raised to the desired level. The temperature is then maintained for a period of time sufficient to effect the desired degree of conversion. The mixture is then cooled and the diisopropyl dihydrocoumarin portion of the reaction mixture, now containing the odorous isomer, is recovered by conventional means including solvent extraction and distillation. The odorous isomer formed in the treatment may then be separated from the odorless isomers by such means as distillation. The remaining odorless isomers may then be reused as starting material to form more of the odorous isomer.

The following example is offered to illustrate the process of this invention. It is not intended, however, to limit the invention to the particular conditions or procedures illustrated therein.

Example

An isomeric mixture of diisopropyl-3,4-dihydrocoumarin was treated according to the process of this invention to prepare an odorous isomer according to the following procedure:

The catalyst mixture for the treatment was prepared by charging 500 grams of 85 weight percent orthophosphoric acid to a stirred reactor equipped with heating/cooling means. With stirring, the temperature was adjusted to about 100° C. and, while maintaining such temperature, 247.5 grams of phosphorus pentoxide were added over about ¼ hour. The stirring was continued for about ½ hour more to obtain a catalyst mixture of about 747.5 grams of substantially anhydrous orthophosphoric acid containing about 6.7 weight percent of phosphorus pentoxide. About 15 grams of the catalyst mixture were charged to a reactor and then about 7.4 grams of an isomeric diisopropyl-3,4-dihydrocoumarin mixture containing a small amount of a tri-isopropyl dihydrocoumarin were added to the reactor. This isomeric diisopropyl-3,4-dihydrocoumarin mixture was substantially odorless and had a boiling range of from about 165° to 187° C. at 2 mm. Hg. With stirring, the reaction mixture was heated to about 150° to 160° C. and maintained thereat for about 1½ hours. The organic, diisopropyl dihydrocoumarin phase of the reaction mixture now had a fine musk-like odor. The reaction mixture was cooled and diethyl ether was added to extract the organic phase. The extract was washed with water, dried and then analyzed by gas liquid chromatography. This analysis, as compared to the analysis of the starting material, is summarized in the following table:

| Isomer fraction | Weight percent | |
| --- | --- | --- |
| | Before treatment | After treatment |
| A (odor fraction) | 0 | 18 |
| B | 14.2 | 18.4 |
| C | 25.7 | 4.3 |
| D | 8.6 | 10.3 |
| E | 18.3 | 17.7 |
| F (tri-isopropyl dihydrocoumarin fraction) | 33.2 | 31.2 |

As indicated in the above table, the odor fraction A, believed to be the 5,7-isomer, increased from zero percent to 18 percent in the final mixture. This odor fraction boils within the range of 159° to 161° C. at 3 mm. Hg and, if desired, may be readily separated from the substantially odorless isomers by distillation.

I claim as my invention:

1. A process for producing an odorous diisopropyl-3,4-dihydrocoumarin isomer which comprises contacting a substantially odorless diisopropyl-3,4-dihydrocoumarin isomer with an isomerization catalyst mixture consisting essentially of substantially anhydrous orthophosphoric acid and from about 2 to 12 percent of phosphorus pentoxide based upon the weight of the mixture, and thereafter recovering the desired product.

2. The process according to claim 1 characterized in that the catalyst mixture contains from about 4 to 10 percent of phosphorus pentoxide.

3. The process according to claim 1 characterized in that the contacting is effected at a temperature of from about 110° to 180° C.

4. The process according to claim 1 characterized in that the catalyst mixture is present in from about 25 to 300 percent based upon the weight of the odorless diisopropyl-3,4-dihydrocoumarin.

5. The process according to claim 1 characterized in that 5,7-diisopropyl-3,4-dihydrocoumarin is recovered as the product.

6. The process according to claim 1 characterized in that an isomeric mixture of diisopropyl-3,4-dihydrocoumarins is contacted with the catalyst mixture to form the odorous isomer.

7. The process according to claim 1 characterized in that the catalyst mixture is prepared by adding phosphorus pentoxide to aqueous orthophosphoric acid in an amount adjusted to convert substantially all of the water present to orthophosphoric acid and to provide an excess of the phosphorus pentoxide of from about 2 to 12 percent based upon the weight of the mixture.

8. The process according to claim 7 characterized in that the phosphorus pentoxide is added to the aqueous orthophosphoric acid at a temperature of from about 100° to 150° C.

9. The process according to claim 7 characterized in that the phosphorus pentoxide is added in an amount adjusted so that the excess phosphorus pentoxide is from about 4 to 10 percent.

10. The process according to claim 7 characterized in that the catalyst mixture is prepared by adding phosphorus pentoxide to aqueous orthophosphoric acid containing about 85 weight percent acid at a temperature of from about 100° to 130° C. in an amount adjusted to convert all of the water present to orthophosphoric acid and to provide an excess of the phosphorus pentoxide of from about 4 to 10 percent based upon the weight of the mixture.

References Cited

UNITED STATES PATENTS 3,144,467 8/1964 Houlihan _____ 260—343.2
3,258,400 6/1966 Houlihan _____ 167—94

JAMES A. PATTEN, *Primary Examiner.*

U.S. Cl. X.R.

252—522; 424—281